United States Patent
Okawa et al.

(10) Patent No.: US 8,643,312 B2
(45) Date of Patent: Feb. 4, 2014

(54) METHOD FOR FEEDING ELECTRIC POWER TO A PLANAR LIGHT-EMITTING ELEMENT

(75) Inventors: Masanao Okawa, Nara (JP); Hirofumi Konishi, Hirakata (JP); Takeo Miyai, Hirakata (JP); Hideharu Kawachi, Kobe (JP); Koki Fujihara, Amagasaki (JP)

(73) Assignee: Panasonic Corporation, Osaka (JP)

( * ) Notice: Subject to any disclaimer, the term of this patent is extended or adjusted under 35 U.S.C. 154(b) by 195 days.

(21) Appl. No.: 12/659,974

(22) Filed: Mar. 26, 2010

(65) Prior Publication Data
US 2010/0244749 A1 Sep. 30, 2010

(30) Foreign Application Priority Data

Mar. 26, 2009 (JP) ................................. 2009-076101

(51) Int. Cl.
*H05B 37/02* (2006.01)
(52) U.S. Cl.
USPC ............................ 315/360; 315/363; 315/362
(58) Field of Classification Search
USPC .......... 315/360, 363, 362, 323, 320; 345/204; 313/494, 483, 506
See application file for complete search history.

(56) References Cited

U.S. PATENT DOCUMENTS

| | | | |
|---|---|---|---|
| 6,462,468 B1 | 10/2002 | Jones et al. | |
| 6,587,087 B1 * | 7/2003 | Ishizuka | ........................ 345/82 |
| 6,803,729 B2 * | 10/2004 | Muruyama | ................ 315/169.1 |
| 8,223,178 B2 * | 7/2012 | Furukawa et al. | ............. 345/691 |
| 2002/0084993 A1 * | 7/2002 | Taneya et al. | ................. 345/204 |
| 2002/0176930 A1 * | 11/2002 | Peng | ................................. 427/58 |
| 2004/0047143 A1 | 3/2004 | Maruyama | |
| 2007/0075636 A1 | 4/2007 | Tobise et al. | |
| 2008/0030127 A1 * | 2/2008 | Tsou et al. | ..................... 313/504 |
| 2008/0042582 A1 | 2/2008 | Masuda et al. | |

FOREIGN PATENT DOCUMENTS

| | | |
|---|---|---|
| JP | 200075836 | 3/2000 |
| JP | 2007-123865 A | 5/2007 |
| WO | 02/102117 | 12/2002 |
| WO | 2005/122648 A1 | 12/2005 |
| WO | WO 2008062645 A1 * | 5/2008 |

OTHER PUBLICATIONS

Extended European Search Report, dated Aug. 9, 2010.
Korean office action dated Jul. 21, 2011 and English summary thereof.
Chinese Office Action in corresponding Chinese Patent Application No. 201010150487.3 dated Jul. 11, 2012 with English translation.
Japanese Office Action in corresponding Japanese Application No. 2009-076101 dated Aug. 21, 2012 with English Summary.

\* cited by examiner

*Primary Examiner* — Jacob Y Choi
*Assistant Examiner* — Henry Luong
(74) *Attorney, Agent, or Firm* — Bacon & Thomas, PLLC

(57) ABSTRACT

A method for feeding electric power to a planar light-emitting element which includes a planar anode electrode, a planar cathode electrode, a light-emitting layer provided between the anode electrode and the cathode electrode, two or more anode terminal portions protruding from the anode electrode and one or more cathode terminal portions protruding from the cathode electrode. The method includes sequentially providing the electric power to the anode terminal portions.

2 Claims, 14 Drawing Sheets

LUMINANCE DISTRIBUTION ON LINE h1-h2

LUMINANCE DISTRIBUTION ON LINE h1-h2

LUMINANCE DISTRIBUTION ON LINE v1-v2

FIG.16A
FIG.16B
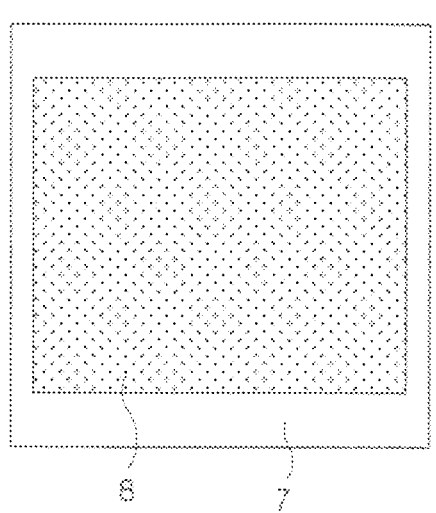
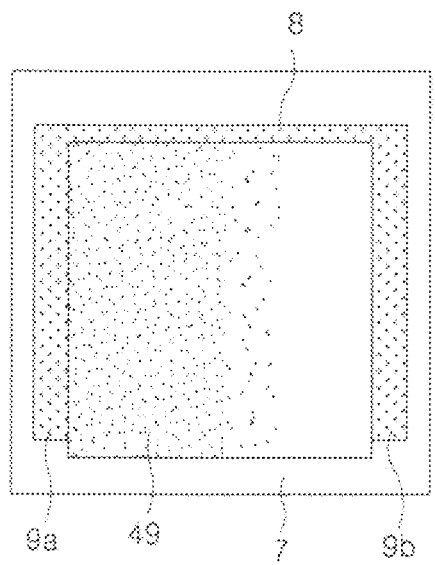
FIG.16C
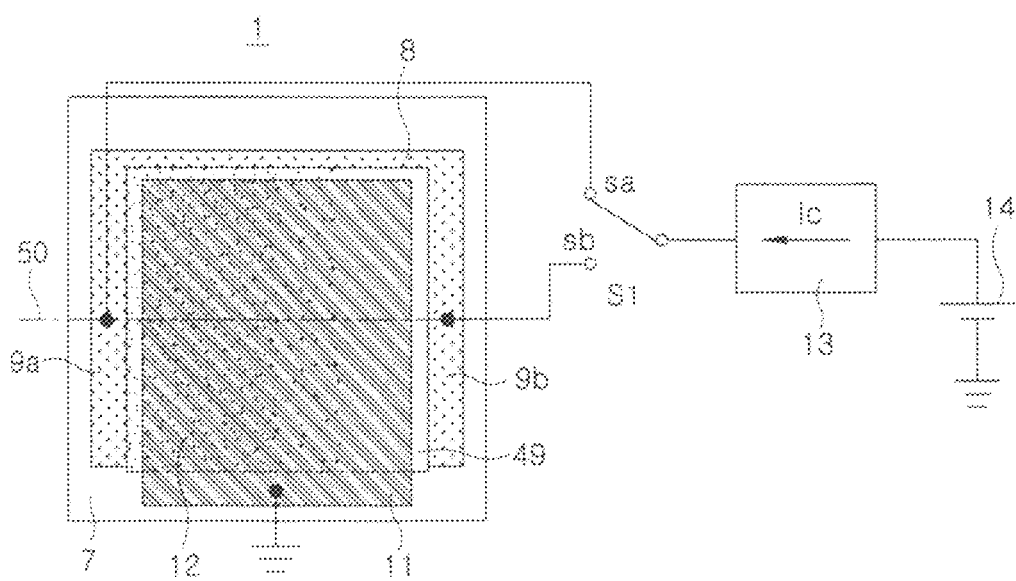

METHOD FOR FEEDING ELECTRIC POWER TO A PLANAR LIGHT-EMITTING ELEMENT

FIELD OF THE INVENTION

The present invention relates to a method for feeding electric power to a planar light-emitting element, which can adjust a luminance distribution.

BACKGROUND OF THE INVENTION

One example of conventional planar light-emitting elements (hereinafter referred to as "light-emitting element") is shown in FIG. 18. The light-emitting element 100 includes a base 101, an anode electrode 102, a light-emitting layer 103 and a cathode electrode 104, the latter three of which are laminated in that order on the base 101. An anode terminal portion 105 protrudes from the anode electrode 102 and a cathode terminal portion 106 protrudes from the cathode electrode 104. Electric power is fed from a power source 108 to the anode terminal portion 105 and the cathode terminal portion 106 via a constant current circuit 107.

In operation of the light-emitting element 100, the anode electrode 102 injects holes into the light-emitting layer 103 and the cathode electrode 104 injects electrons into the light-emitting layer 103, upon application of an electric voltage. The holes and electrons thus injected are combined together in the light-emitting layer 103 to generate excitons. The excitons make transition to a ground state, thus emitting light.

If electric power is normally fed to the anode terminal portion 105, the in-plane electric potential gradient of the anode electrode 102 with respect to the light-emitting layer 103 grows higher due to a high sheet resistance of the anode electrode 102, which leads to increased luminance variations.

In view of this, it may be thought to employ a light-emitting element 110 having a plurality of anode terminal portions 105a and 105b as illustrated in FIG. 19. If an electric current is supplied in parallel through these anode terminal portions 105a and 105b, it is possible to suppress occurrence of the in-plane electric potential gradient of the anode electrode 102 with respect to the light-emitting layer 103 and to reduce the luminance variations.

However, the peak value of the electric current flowing through the anode terminal portions 105a and 105b varies depending on the position and size of the anode terminal portions 105a and 105b. For that reason, it is difficult to completely prevent occurrence of the electric potential gradient.

As a solution to this problem, it may be contemplated to employ a light-emitting element 110 to which variable resistors 111a and 111b are connected as shown in FIG. 20. The variable resistors 111a and 111b are connected between the anode terminal portions 105a and 105b and the constant current circuit 107, respectively. The resistance between the anode electrode 102 and the power source 108 can be matched by adjusting the resistance values of the variable resistors 111a and 111b. This makes it possible to suppress occurrence of the electric potential gradient in the anode electrode 102.

However, the resistances are varied from electrode to electrode due to a temperature gradient in the anode electrode 102 or the light-emitting element 110 caused by the installation state and direction of the light-emitting element 110. For that reason, it is difficult to equalize the current values supplied to the anode terminal portions 105a and 105b.

It may also be contemplated to employ a light-emitting element 110 to which two constant current circuits 107a and 107b are connected as shown in FIG. 21. This makes it possible for the constant current circuits 107a and 107b to equalize the peak values of the current flowing through the anode terminal portions 105a and 105b. As a result, it is possible to suppress occurrence of the electric potential gradient when emitting the light. However, the power feeding circuit becomes complicated because there is a need to provide the anode terminal portions 105a and 105b in plural numbers.

It is known that the light emission characteristics of the light-emitting element vary depending on the composition of a material of which the light-emitting layer is made. This means that it is possible not only to adjust the emission color of the light-emitting element but also to increase the light emission efficiency and the lifespan thereof by properly setting the composition of the material of the light-emitting layer. Further, adjustment of the color of a light emission surface is very useful in the field of light sources. Nevertheless, it is impossible to adjust the color of the light emission surface because the composition of the material of the light-emitting layer cannot be changed after the light-emitting element has been fabricated.

In view of this, it may be contemplated that the adjustment of color of the light emission surface is not performed with a single light-emitting element but by changing the light emission intensity of individual light-emitting elements in a planar illumination device, e.g., a display device, in which a plurality of light-emitting elements differing in emission colors, e.g., red (R), green (G), blue (B) or the like is arranged side by side. However, this is not desirable because the light-emitting elements need to be made in a small size in the planar illumination device, which makes the planar illumination device structurally complicated.

There is also known a planar illumination device in which the light emission color can be arbitrarily changed by independently driving a plurality of laminated planar light-emitting elements each having transparent anode and cathode electrodes (see, e.g., JP2002-260859A and JP2003-288995A). Although such planar illumination device is capable of changing the color of a light emission surface thereof, the thickness thereof is increased because the light-emitting elements are overlapped one above another.

SUMMARY OF THE INVENTION

In view of the above, the present invention provides a method for feeding electric power to a planar light-emitting element, which is capable of causing the light-emitting element to emit light with a uniform luminance distribution and capable of arbitrarily changing the light emission color of the light-emitting element.

In accordance with an embodiment of the present invention, there is provided a method for feeding electric power to a planar light-emitting element which is provided with a planar anode electrode, a planar cathode electrode, a light-emitting layer provided between the anode electrode and the cathode electrode, two or more anode terminal portions protruding from the anode electrode and one or more cathode terminal portions protruding from the cathode electrode, including sequentially providing the electric power to the anode terminal portions.

With the above configuration, it is possible equalize the peak values of electric currents in the anode terminal portions, while equalizing the current supply time periods per unit time in the anode terminal portions. This enables the light-emitting element to emit light with a uniform luminance distribution. In addition, it is possible to make different the current supply time periods per unit time to the anode terminal portions. This makes it possible to change the luminance distribution and to generate a luminance gradation.

The anode terminal portion may be provided in pair near the intersecting points between a line segment passing through the center point of the light-emitting layer and peripheral portions of the light-emitting element and the number of the cathode terminal portions may be one. In this case, the cathode terminal portion may be equally spaced apart from the anode terminal portions.

Therefore, the luminance distributions in the current flow paths flowing from the anode terminal portions to the cathode terminal portion becomes symmetrical with each other. This enables the light-emitting element to emit light with a uniform luminance distribution.

The number of cathode terminal portion may be greater than one.

Since the cathode terminal portions having a low impedance are dispersedly provided in the light-emitting element, it becomes easy for an electric current to flow through the light-emitting element. This enables the light-emitting element to emit light with a uniform luminance distribution.

The anode terminal portions preferably have same size.

With this configuration, it is possible to greatly reduce the impedance difference between the anode terminal portions. This enables the light-emitting element to emit light with a uniform luminance distribution.

The thickness and/or the component ratio of the light-emitting layer may be gradually increased or decreased along a line segment interconnecting one pair of the anode terminal portions and the amounts of electric currents supplied to the anode terminal portions per unit time may be adjusted.

With this configuration, the light emission color of the light-emitting element can be arbitrarily changed by generating a current density distribution and hence a luminance gradation in the light-emitting layer.

BRIEF DESCRIPTION OF THE DRAWINGS

The objects and features of the present invention will become apparent from the following description of preferred embodiments, given in conjunction with the accompanying drawings, in which:

FIGS. 16A, 16B and 16C are views illustrating processes of producing a planar light-emitting element in accordance with a fourth embodiment of the present invention;

DETAILED DESCRIPTION OF THE PREFERRED EMBODIMENTS

Hereinafter, embodiments of the present invention will be described in more detail with reference to accompanying drawings which form a part hereof.

First Embodiment

Figure 1:
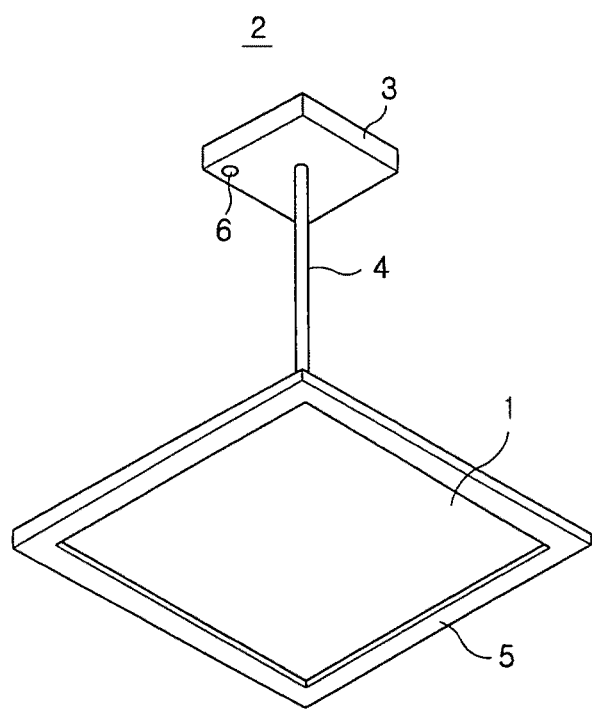
FIG. 1 is an outward appearance view showing an illumination device provided with a planar light-emitting element in accordance with a first embodiment of the present invention.

FIG. 1 shows an illumination device 2 provided with a planar light-emitting element 1 (hereinafter simply referred to as "light-emitting element") in accordance with a first embodiment of the present invention. The illumination device 2 includes a light-emitting element 1, a suspender mechanism 3 for attaching the light-emitting element 1 to a ceiling and a power cord 4 for interconnecting the light-emitting element 1 and the suspender mechanism 3. A periphery of the light-emitting element 1 is covered and protected by a lamp case 5. The suspender mechanism 3 is provided on its surface with a signal receiving portion 6 for receiving a remote control signal transmitted from a remote controller (not shown).

Figure 2A:
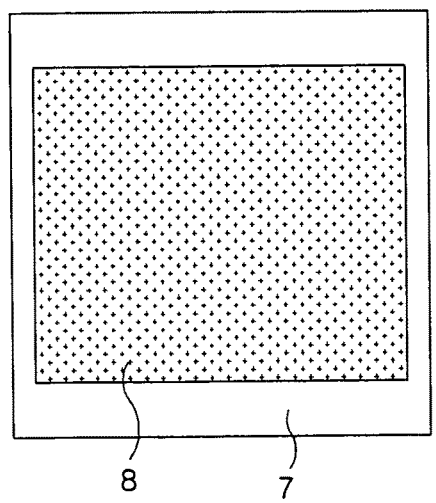
FIGS. 2A, 2B and 2C are views illustrating processes of producing the planar light-emitting element.
Figure 2B:
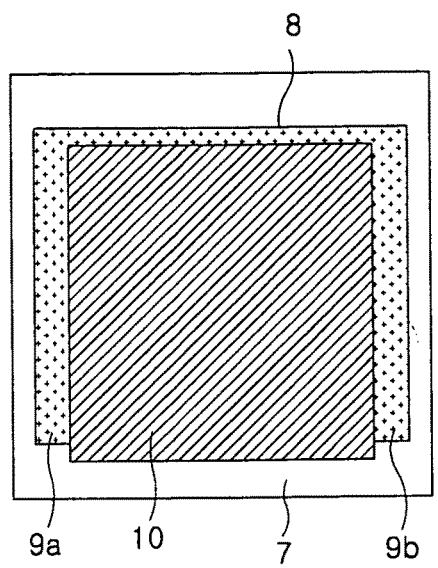

The light-emitting element 1 is produced in the following order. Referring to FIG. 2A, a rectangular planar anode electrode 8 (hereinafter simply referred to as "anode") is first formed on a rectangular base 7. Then, a rectangular light-emitting layer 10 is formed on the portion of the anode 8 other than the marginal portions of two mutually-opposing sides thereof as illustrated in FIG. 2B. The marginal portions of two mutually-opposing sides of the anode 8, on which the light-emitting layer 10 is not formed, are used as anode terminal portions 9a and 9b.

Figure 2C:
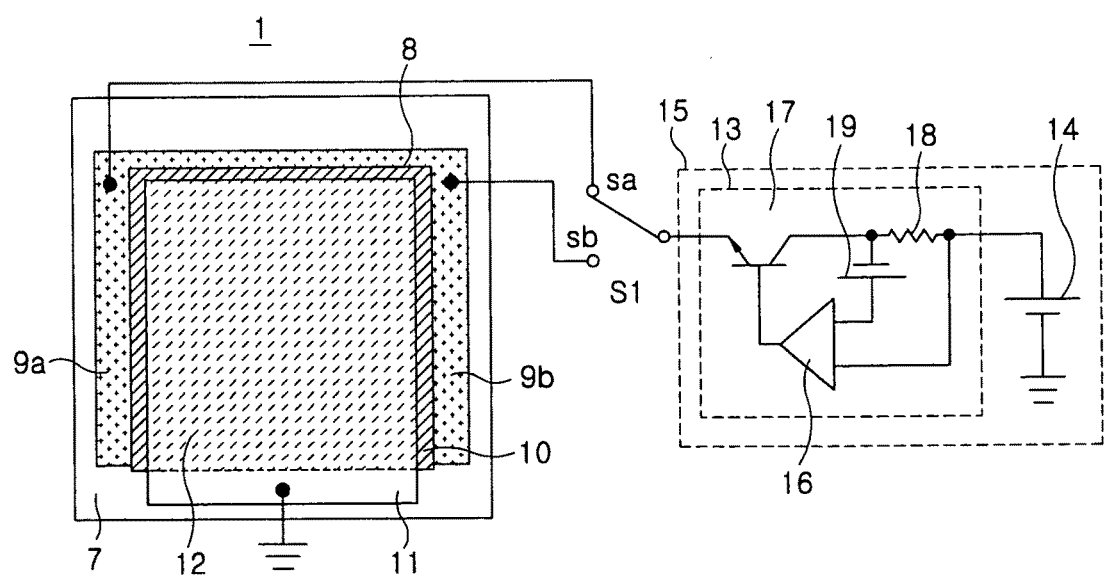

Referring to FIG. 2C, a rectangular planar cathode electrode 12 (hereinafter simply referred to as "cathode") is formed on the base 7 and the light-emitting layer 10 so that the light-emitting layer 10 is arranged between the anode 8 and the cathode 12. For easier understanding of the positional relationship with the light-emitting layer 10, the cathode 12 is illustrated as if it is translucent. A portion of the cathode 12 directly formed on the base 7 serves as a cathode terminal portion 11.

In the light-emitting element 1, the anode terminal portions 9a and 9b are connected through a switch S1 to a driving circuit 15 which includes a constant current circuit 13 and a power source 14, the cathode terminal portion 11 being grounded. The switch S1 includes terminals sa and sb connected to the anode terminal portions 9a and 9b, respectively. The constant current circuit 13 includes an operational amplifier 16, a transistor 17, a current-detecting resistor 18 and a power source 19.

The constant current circuit 13 controls an electric current by comparing a voltage across the current-detecting resistor 18 with a reference value. The driving circuit 15 is installed within the suspender mechanism 3. So is a remote controller circuit for controlling the driving circuit 15 in response to the remote control signal transmitted from a remote controller, or the like. The light-emitting element 1 emits light when supplied with electric power from the driving circuit 15 through the power cord 4.

The base 7 is made from a glass plate, a resin plate or a film. For example, a plastic sheet, a composite of glass and plastic, a transparent ceramic plate, a cured resin body or a sheet or film made of an organic or inorganic hybrid material may be used as a material from which the base 7 is made.

The material of the anode 8 is not particularly limited insofar as it does not impair the functions of the light-emitting element 1. Examples of the material of the anode 8 include a transparent electrically conductive film made of ITO, IZO, AZO, GZO, ATO, $SnO_2$ or the like; a metallic thin film made of Ag, Au, Al or the like; an electrically conductive organic material; or a combination thereof. The anode terminal portions 9a and 9b protruding from the anode 8 are made of the same material as that of the anode 8. The anode 8 and the cathode 12 are formed by, e.g., a vacuum deposition method.

The anode terminal portions 9a and 9b are identical in size. Accordingly, an impedance difference hardly occurs between the anode terminal portions 9a and 9b in the light-emitting element 1. As a result, it is possible for the light-emitting element 1 to emit light with a uniform luminance distribution.

Examples of the material of which the light-emitting layer 10 is made include anthracene, naphthalene, pyrene, tetracene, coronene, perylene, phthaloperylene, naphthaloperylene, diphenylbutadiene, tetraphenylbutadiene, coumarin, oxadiazole, bisbenzoxazoline, bisstyryl, cyclopentadiene, quinoline metal complex, tris(8-hydroxyquinolinate) aluminum complex (Alq3), tris(4-methyl-8-quinolinate) aluminum complex, tris(5-phenyl-8-quinolinate) aluminum complex, aminoquinoline metal complex, benzoquinoline metal complex, trip-terphenyl-4-yl)amine, 1-aryl-2,5-di(2-thienyl) pyrrole derivative, pyrene, quinacridone, rubrene, distyrylbenzene derivative, distyrylarylene derivative, distyrylamine derivative, and various kinds of fluorescent pigments. The light-emitting layer 10 is formed by using, e.g., an in-line type deposition method and, accordingly, the component ratio and thickness of the light-emitting layer 10 become uniform in the film surface direction.

Examples of the material of which the cathode 12 is made include alkali metal, alkali metal halide, alkali metal oxide, alkali earth metal, and alloys of these substances and other metal. Specific examples thereof include sodium, sodium-potassium alloys, lithium, magnesium, magnesium-silver mixtures, magnesium-indium mixtures, aluminum-lithium alloys, and Al—LiF mixtures. Aluminum or Al—$Al_2O_3$ mixtures may also be used as the material of the cathode 12.

Alternatively, the cathode 12 may be formed by laminating one or more layers of electric conductive material, e.g., metal, on a base layer made of alkali metal oxide, alkali metal halide or metal oxide. More specifically, a laminated body of alkali metal and aluminum, a laminated body of alkali metal halide, alkali earth metal and aluminum, or a laminated body of alkali metal oxide and aluminum may be used as the material of the cathode 12. The cathode terminal portion 11 protruding from the cathode 12 is made of the same material as that of the cathode 12.

Figure 3:
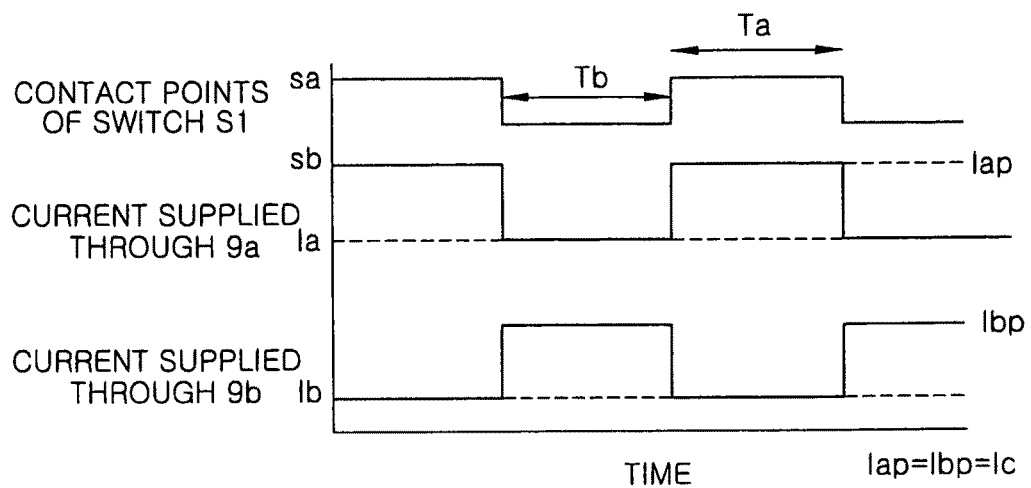
FIG. 3 is a view showing the timing at which an electric power is fed to the planar light-emitting element.

A method for feeding electric power to the light-emitting element 1 in accordance with the present embodiment will be described below. FIG. 3 shows the timing at which electric power is fed to the light-emitting element 1 of the present embodiment. Ta denotes the current supplying time period for which an electric current is supplied to the anode terminal portion 9a when the contact point of the switch S1 is placed on the terminal sa. Tb signifies the current supplying time period for which an electric current is supplied to the anode terminal portion 9b when the contact point of the switch S1 is placed on the terminal sb.

An electric current Ia supplied to the anode terminal portion 9a has a peak value Iap, while an electric current Ib supplied to the anode terminal portion 9b has a peak value Ibp. The current supplying time periods Ta and Tb can be arbitrarily set by controlling the timing at which the contact point of the switch S1 is changed over. The peak values Iap and Ibp are all equal to the peak value Ic of the electric current outputted from the constant current circuit 13. Therefore, the light-emitting element 1 is supplied with a constant current having the peak value Ic with no influence of the temperature difference of the anode 8 or the light-emitting element 1 which may be caused by the installation state or direction of the light-emitting element 1.

When the current supply timing alternated so that the current supplying time periods Ta and Tb per unit time can be equalized, the light-emitting element 1 can emit light with a uniform luminance distribution because the peak values Iap and Ibp are equal to the peak value Ic. The frequency, at which the current supply timing is changed over, is preferably set within the range where one cannot visually recognize the change in the luminance distribution. For example, the frequency may be 150 Hz or more. Provision of one constant current circuit 13 is enough. There is no need to employ a structurally complicated driving circuit. This makes it possible to reduce the production cost of the light-emitting element 1.

If necessary, the current supplying time periods Ta and Tb per unit time may be set to have a difference in which case luminance gradation can be generated by changing the luminance distribution.

Figure 4:
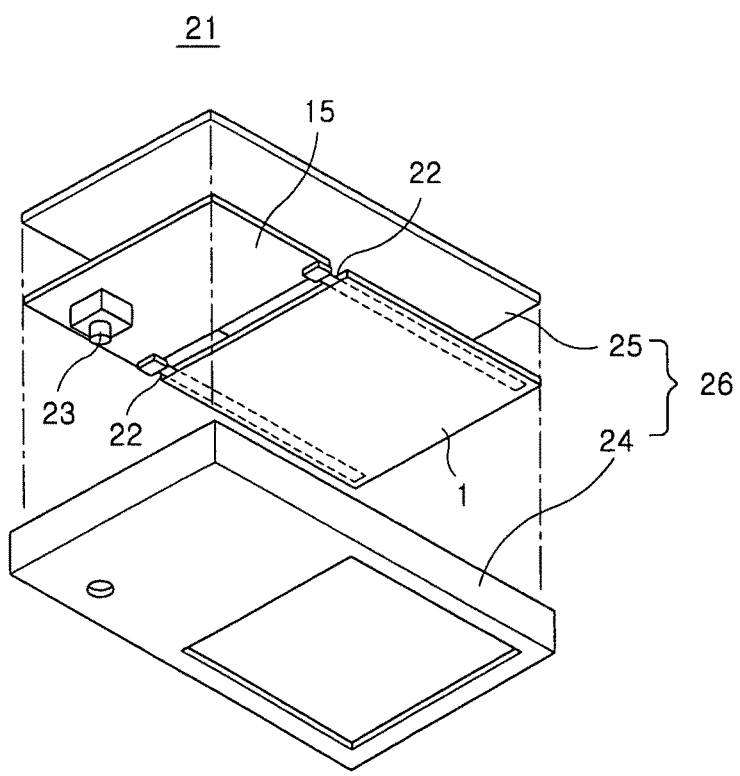
FIG. 4 is an exploded perspective view showing a modified example of the illumination device provided with the planar light-emitting element.

Next, description will be made on a modified example of the illumination device. FIG. 4 shows the modified example of the illumination device. The illumination device 21 includes a light-emitting element 1, a driving circuit 15 electrically connected to the light-emitting element 1 through wiring lines 22, a changeover switch 23 installed in the driving circuit 15, and a protection cover 26 formed of a front case 24 and a rear plate 25 for holding the light-emitting element 1 and the driving circuit 15 therebetween. The rear plate 25 of the illumination device 21 is attached to the ceiling. The power can be turned on or off by using the changeover switch 23.

Figure 5A:
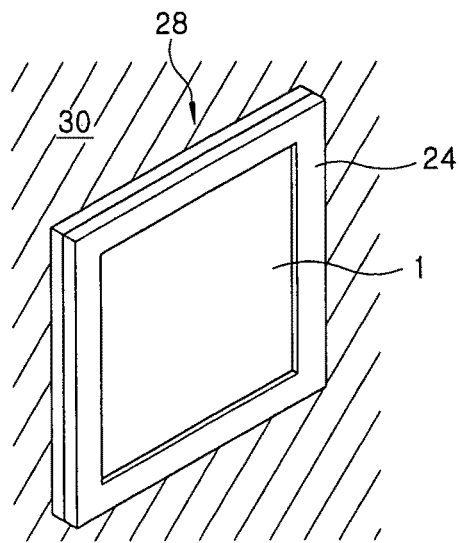
FIGS. 5A and 5B are outward appearance views showing another modified example of the illumination device provided with the planar light-emitting element.
Figure 5B:
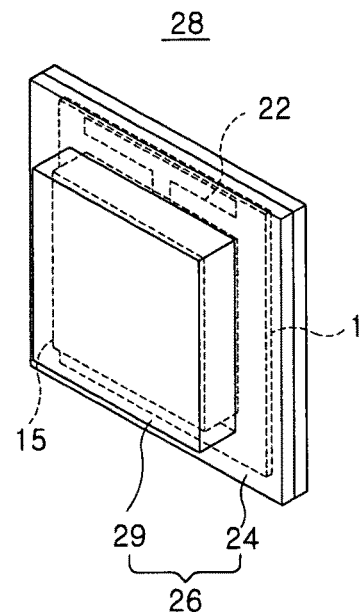

FIGS. 5A and 5B show another Modified example of the illumination device. The illumination device 28 includes a light-emitting element 1, a driving circuit 15 electrically connected to the light-emitting element 1 through a wiring line 22, and a protection cover 26 formed of a front case 24 and a rear case 29 for holding the light-emitting element 1 and the driving circuit 15 therebetween. The driving circuit 15 is arranged at the rear side of the light-emitting element 1 and received within the rear case 29. The rear case 29 of the illumination device 28 is embedded in the wall surface 30 in its entirety so that the plane of the light-emitting element 1 can be kept perpendicular with respect to the ground surface.

Figure 6:
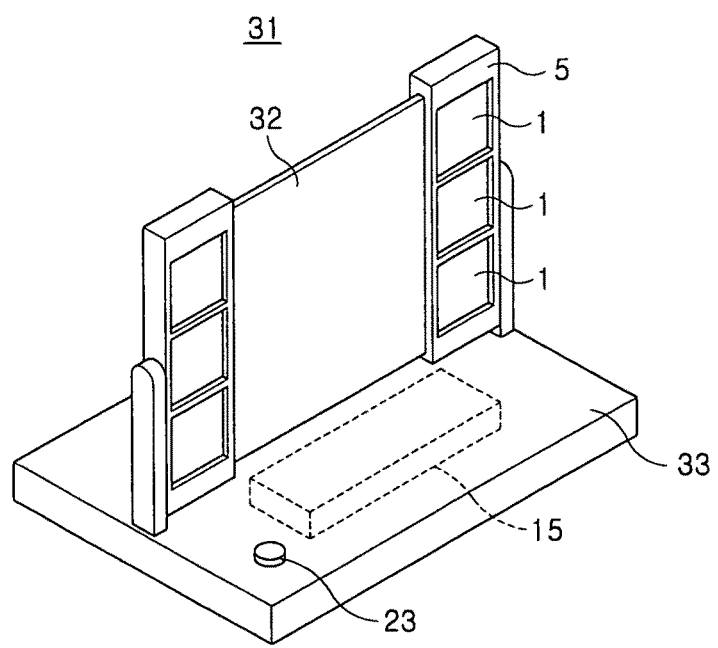
FIG. 6 is a perspective view showing still another modified example of the illumination device provided with the planar light-emitting element.

FIG. 6 shows still another modified example of the illumination device. The illumination device 31 includes a plurality of light-emitting elements 1, a mirror 32, a lamp case 5 for covering the peripheries of the light-emitting elements 1 and a power source case 33 for holding the lamp case 5 and the mirror 32 in place. The lamp case 5 is configured to hold the light-emitting elements 1 and the mirror 32 so that their surfaces can be placed in same plane. The power source case 33 includes a driving circuit 15 for driving the light-emitting elements 1 and a changeover switch 23 for turning on or off the electric power. The modified illumination devices 21, 28 and 31 can provide the same advantageous effects as available in the illumination device 2 described earlier.

Second Embodiment

Figure 7:
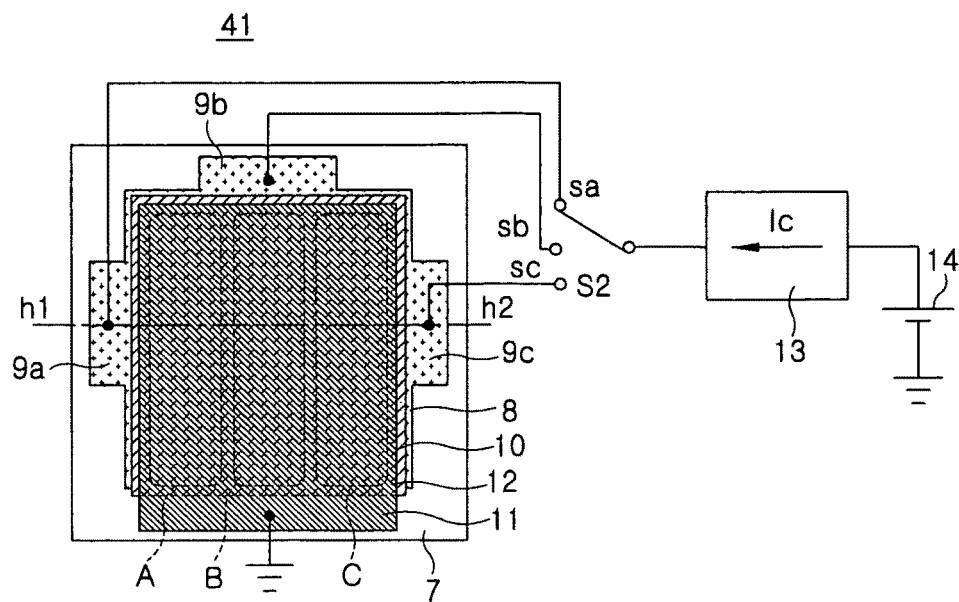
FIG. 7 is a plan view showing a planar light-emitting element in accordance with a second embodiment of the present invention.

FIG. 7 shows a light-emitting element in accordance with a second embodiment of the present invention. The light-emitting element 41 differs from the light-emitting element 1 of the first embodiment in that it includes three anode terminal portions 9a, 9b and 9c. Other configurations remain the same. The light-emitting element 41 includes three anode terminal portions 9a, 9b and 9c protruding from three sides of the anode 8 and a cathode terminal portion 11 protruding from one side of the cathode 12. The anode terminal portion 9a is arranged in an opposing relationship with the anode terminal portion 9c, while the anode terminal portion 9c is arranged in an opposing relationship with the cathode terminal portion 11.

In the light-emitting element 41, the anode terminal portions 9a, 9b and 9c are electrically connected to the constant current circuit 13 and the power source 14 through a switch S2, the cathode terminal portion 11 being grounded. The switch S2 includes a terminal sa connected to the anode terminal portion 9a, a terminal sb connected to the anode terminal portion 9b and a terminal sc connected to the anode terminal portion 9c. As the contact point of the switch S2 is changed over to make contact with one of the terminals sa, sb and sc, the corresponding one of the anode terminal portions 9a, 9b and 9c is supplied with a constant current having a peak value Ic.

The line passing through the centers of the anode terminal portions 9a and 9c is designated by line h1-h2. The three portions, i.e., the left portion, the central portion and the right portion of the light-emitting layer 10 corresponding to the paths of the electric current supplied to the anode terminal portions 9a, 9b and 9c are designated by regions A, B and C, respectively.

Figure 8:
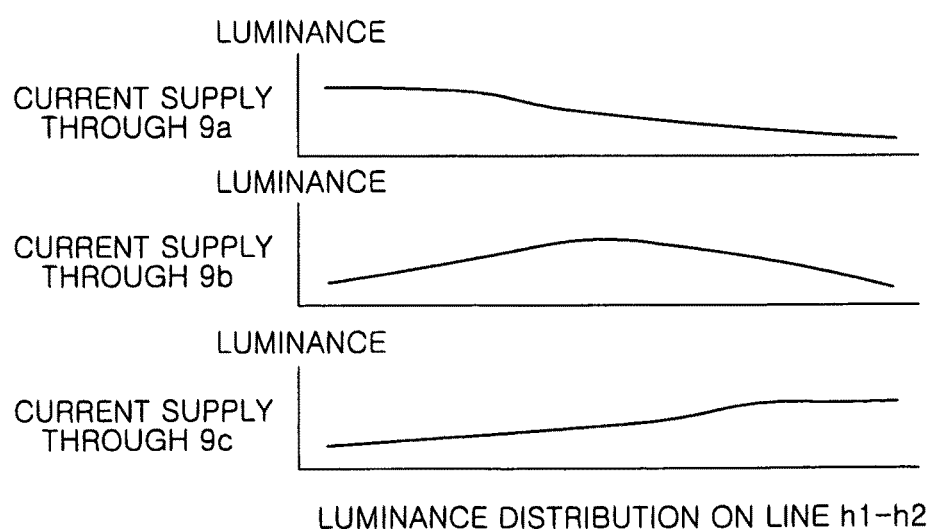
FIG. 8 is a view representing different luminance distributions taken along the h1-h2 line of the planar light-emitting element shown in FIG. 7.

A method for feeding electric power to the light-emitting element 41 of the present embodiment will be described below. As illustrated in FIG. 8, the luminance distribution taken along line h1-h2 of the light-emitting element 41 when an electric current is supplied to the anode terminal portion 9a has a peak at the side closer to the anode terminal portion 9a (namely, at the left side in the graph). When an electric current is supplied to the anode terminal portion 9b, the luminance distribution taken along line h1-h2 of the light-emitting element 41 has a peak at the side closer to the anode terminal portion 9b (namely, at the central portion in the graph). If an electric current is supplied to the anode terminal portion 9c, the luminance distribution taken along line h1-h2 of the light-emitting element 41 has a peak at the side closer to the anode terminal portion 9c (namely, at the right side in the graph).

The average luminance in the regions A, B and C of the light-emitting element 41 was measured, the results of which are shown in Table 1.

TABLE 1

|  | Region A | Region B | Region C |
|---|---|---|---|
| Current supplied through 9a | 4 | 2 | 1 |
| Current supplied through 9b | 1 | 3 | 1 |
| Current supplied through 9c | 1 | 2 | 4 |

As can be seen in Table 1, the luminance ratio in regions A, B and C is 4:2:1 when an electric current is supplied to the anode terminal portion 9a, 1:3:1 when an electric current is supplied to the anode terminal portion 9b, and 1:2:4 when an electric current is supplied to the anode terminal portion 9c. If the current supplying time periods Ta, Tb and Tc for which an electric current is supplied to the anode terminal portions 9a, 9b and 9c are set to have a ratio of 2:1:2, the average luminance in the regions A, B and C is equalized. This enables the light-emitting element 41 to emit light with a uniform luminance distribution.

In the light-emitting element 41, the ratio of the current supplying time periods Ta, Tb and Tc can be changed from 2:1:2 by controlling the current supply timing, thereby causing variation in a current density distribution within the light emission surface. That is, it is possible to intentionally produce an uneven luminance distribution, thereby generating a luminance gradation. In addition, if the ratio of the current supplying time periods Ta, Tb and Tc is changed continuously, it becomes possible to realize the illumination by which the light emission color is wavily changed within a light emission surface.

Figure 9:
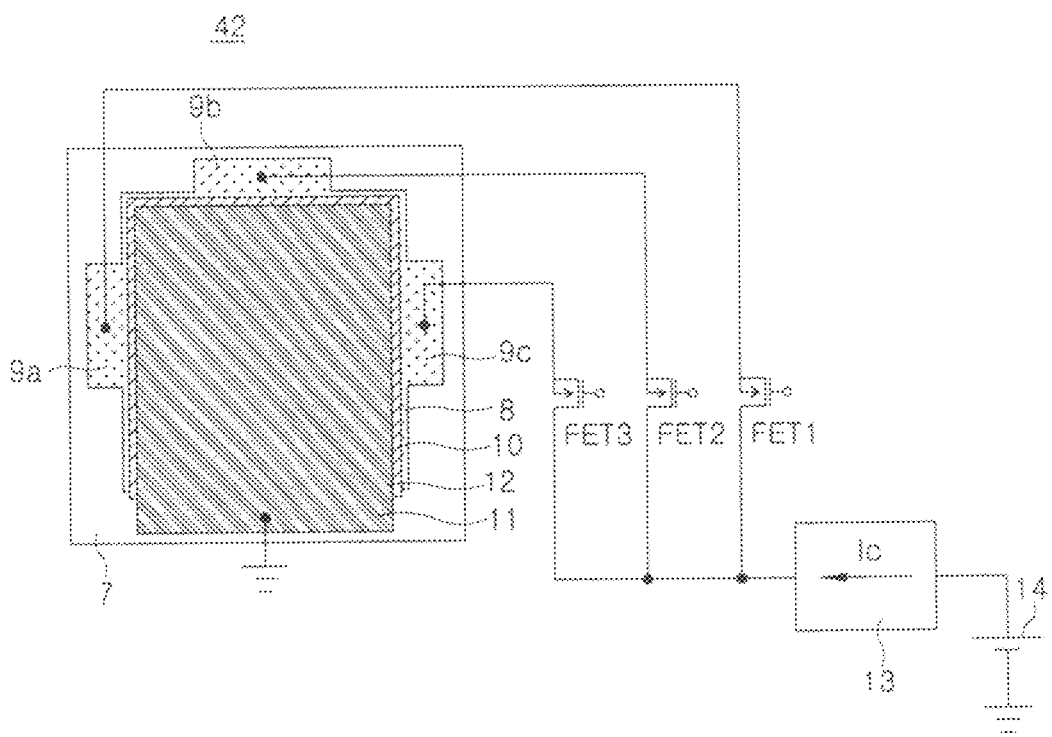
FIG. 9 is a plan view showing a modified example of the planar light-emitting element of the second embodiment.

FIG. 9 shows a light-emitting element 42 according to a modified example of the light-emitting element 41. The light-emitting element 42 includes field effect transistors FET1, FET2 and FET3 in place of the switch S2 set forth above. The current flow paths are changed by changing over the application of a gate voltage to the field effect transistors FET1, FET2 and FET3.

Figure 10:
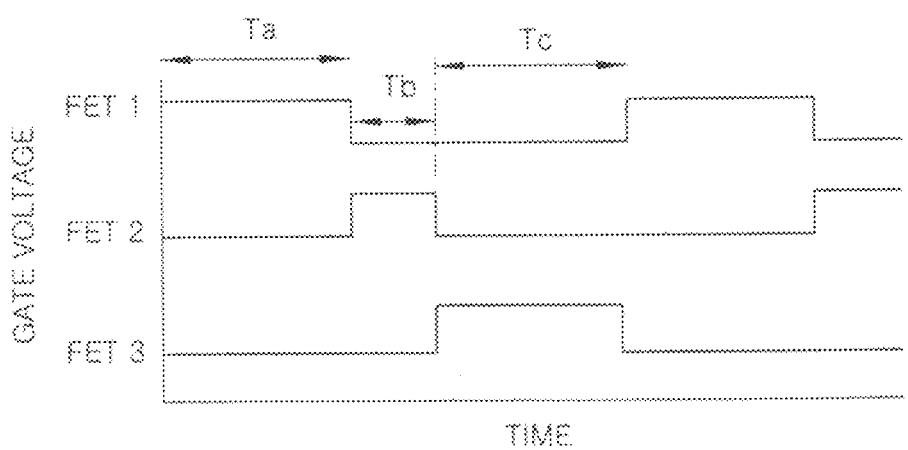
FIG. 10 is a view showing the timing at which an electric power is fed to the modified example of the planar light-emitting element shown in FIG. 9.

Description will be made on a method for feeding electric power to the light-emitting element 42. As shown in FIG. 10, if the ratio of the current supplying time periods Ta, Tb and Tc is set equal to 2:1:1 as in the light-emitting element 41 by changing over the application of a gate voltage to the field effect transistors FET1, FET2 and FET3, it is possible for the light-emitting element 42 to emit light with a uniform luminance distribution. If the ratio of the current supplying time periods Ta, Tb and Tc is changed from 2:1:2 by changing the current supply timing, there occurs variation in a current density distribution within the light emission surface. This makes it possible to intentionally produce an uneven luminance distribution, thereby generating a luminance gradation.

Figure 11:
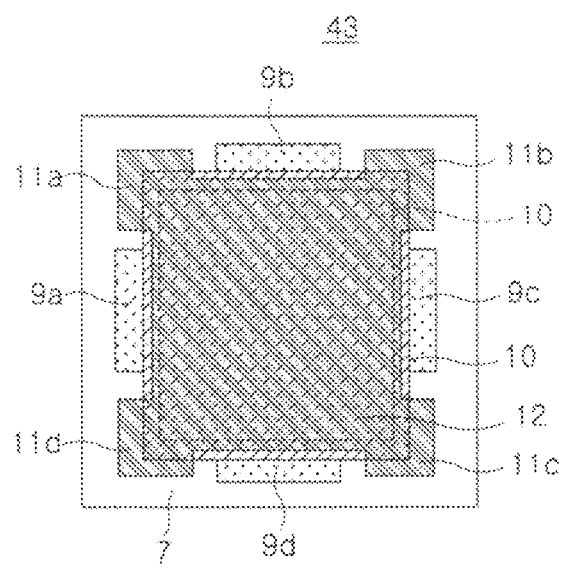
FIG. 11 is a plan view showing another modified example of the planar light-emitting element of the second embodiment.

FIG. 11 shows a light-emitting element 43 according to another modified example of the light-emitting element 41. The light-emitting element 43 includes anode terminal portions 9a, 9b, 9c and 9d provided at four sides of the anode 8 and cathode terminal portions 11a, 11b, 11c and 11d provided at four corners of the cathode 12. The light-emitting element 43 can obtain a uniform luminance distribution by equalizing the current supply time periods for which an electric current is supplied to the anode terminal portions 9a, 9b, 9c and 9d. In addition, if the current supply timing is set differently, the light-emitting element 43 can change the luminance distribution to generate a luminance gradation.

For example, if the time period for which an electric current is supplied to the anode terminal portion 9a is increased, the light-emitting element 43 can obtain a luminance distribution in which a luminance is high near the anode terminal portion 9a. Since the cathode terminal portions 11a, 11b, 11c and 11d having a low impedance are dispersedly provided in the light-emitting element 43, it becomes easy for an electric current to flow through the light-emitting element 43. This enables the light-emitting element 43 to emit light with a uniform luminance distribution.

The shape of the anode terminal portions 9a, 9b, 9c and 9d and the cathode terminal portions 11a, 11b, 11c and 11d may be changed, if necessary. The number of the anode terminal portions may be increased, in which case it becomes possible to realize light emission in various patterns. Likewise, the number of the cathode terminal portions may be increased, in which case it becomes easier for an electric current to flow through the light-emitting element 43.

Third Embodiment

Figure 12:
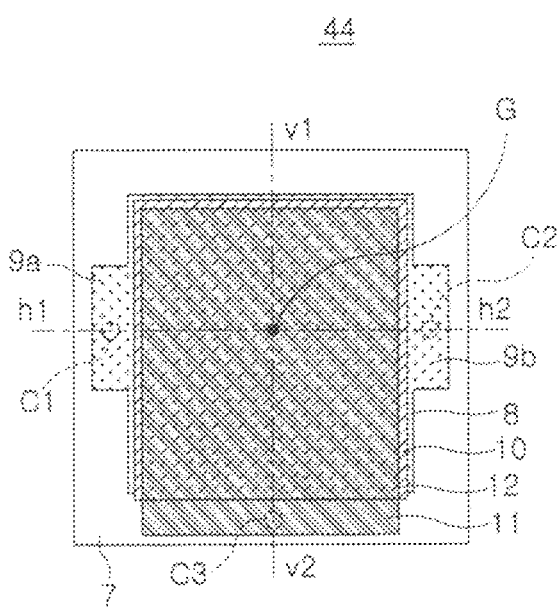
FIG. 12 is a plan view showing a planar light-emitting element in accordance with a third embodiment of the present invention.

FIG. 12 shows a light-emitting element 44 in accordance with a third embodiment of the present invention. The light-emitting element 44 of the present embodiment differs from that of the first embodiment in that a pair of anode terminal portions 9a and 9b is provided in specified positions. Other configurations remain the same. The anode terminal portions 9a and 9b are provided in pair near the intersecting points between line h1-h2 passing through the center G of the light-emitting layer 10 and the periphery portions of the light-emitting element 44.

The cathode terminal portion 11 is provided in a position equally spaced apart from the anode terminal portions 9a and 9b. In other words, the distance between the center C1 of the anode terminal portion 9a and the center C3 of the cathode terminal portion 11 is equal to the distance between the center C2 of the anode terminal portion 9b and the center C3 of the cathode terminal portion 11. The line passing through the center G of the light-emitting layer 10 and the center C3 of the cathode terminal portion 11 is designated by line v1-v2.

Figure 13A:
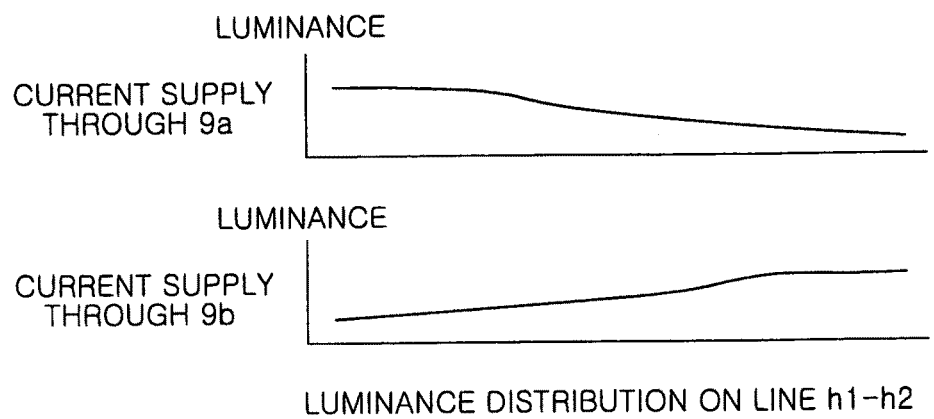
FIG. 13A is a view representing different luminance distributions taken along the h1-h2 line of the planar light-emitting element of the third embodiment.
Figure 13B:
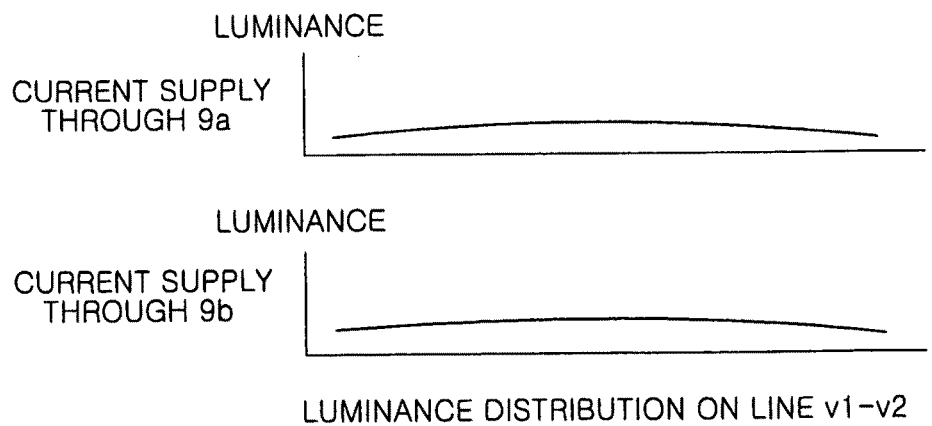
FIG. 13B is a view representing different luminance distributions taken along the v1-v2 line thereof.

Referring to FIGS. 13A and 13B, the luminance distribution taken along line h1-h2 of the light-emitting element 44 when an electric current is supplied to the anode terminal portion 9a has a peak at the side closer to the anode terminal portion 9a (namely, at the left side in the graph). When an electric current is supplied to the anode terminal portion 9b, the luminance distribution taken along line h1-h2 of the light-emitting element 44 has a peak at the side closer to the anode terminal portion 9b (namely, at the right side in the graph). The luminance distribution taken along line v1-v2 of the light-emitting element 44 when an electric current is supplied to the anode terminal portions 9a and 9b has a peak at the side closer to the anode terminal portions 9a and 9b (namely, at the central portion in the graph).

The luminance distributions in the current flow paths extending from the anode terminal portions 9a and 9b to the cathode terminal portion 11 are symmetrical with each other. Therefore, the light-emitting element 44 can emit light with a uniform luminance distribution by making the ratio of the current supplying time periods equal.

Figure 14:
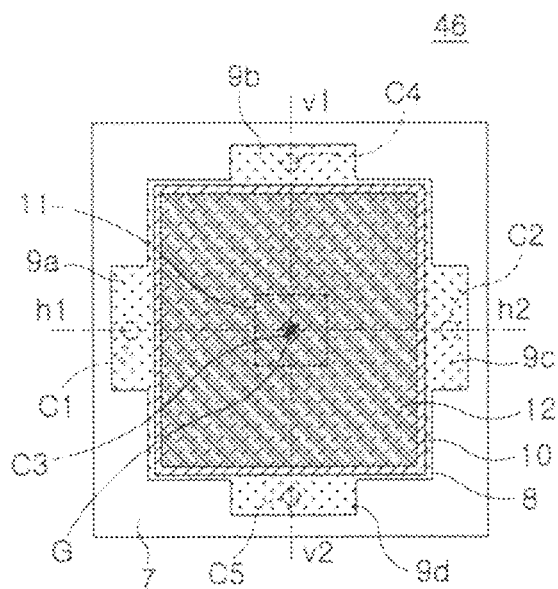
FIG. 14 is a plan view showing a modified example of the planar light-emitting element of the third embodiment.

FIG. 14 shows a light-emitting element 46 according to a modified example of the light-emitting element 44. The light-emitting element 46 includes anode terminal portions 9a, 9b, 9c and 9d protruding from four sides of the anode 8 and cathode terminal portion 11 provided at the center portion of the planar cathode 12. The anode terminal portions 9a and 9c are provided in pair near the intersecting points between line h1-h2 passing through the center G of the light-emitting layer 10 and the peripheral portions of the light-emitting element 46. The distance between the center C1 of the anode terminal portion 9a and the center C3 of the cathode terminal portion 11 is equal to the distance between the center C2 of the anode terminal portion 9c and the center C3 of the cathode terminal portion 11.

In the light-emitting element 46, the anode terminal portions 9b and 9d may be provided in pair near the intersecting points between line v1-v2 passing through the center G of the light-emitting layer 10 and the peripheral portions of the light-emitting element 46. In this case, the distance between the center C4 of the anode terminal portion 9b and the center C3 of the cathode terminal portion 11 is equal to the distance between the center C5 of the anode terminal portion 9d and the center C3 of the cathode terminal portion 11.

Figure 15:
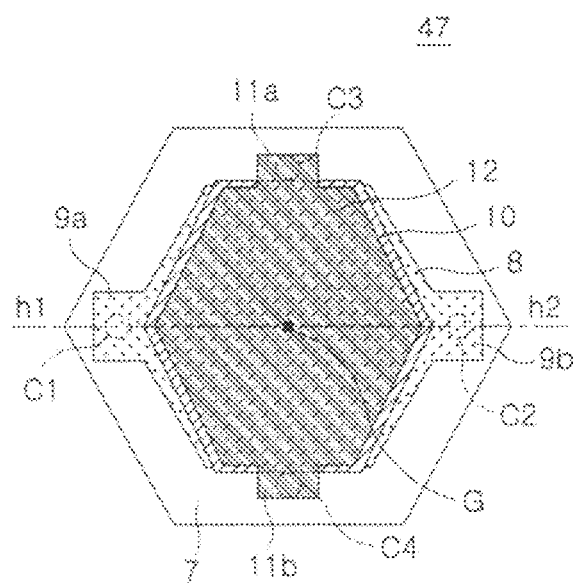
FIG. 15 is a plan view showing another modified example of the planar light-emitting element of the third embodiment.

FIG. 15 shows a light-emitting element 47 according to another modified example of the light-emitting element 44. The light-emitting element 47 includes a base 8, an anode 8, a light-emitting layer 10 and a cathode 12, the shape of which is hexagonal. Anode terminal portions 9a and 9b are provided to protrude from two apex points of the anode 8, while cathode terminal portions 11a and 11b are provided to protrude from two sides of the cathode 12.

The anode terminal portions 9a and 9b are provided in pair near the intersecting points between line h1-h2 passing through the center G of the light-emitting layer 10 and the peripheral portions of the light-emitting element 47. The distance between the center C1 of the anode terminal portion 9a and the center C3 of the cathode terminal portion 11a is equal to the distance between the center C2 of the anode terminal portion 9b and the center C3 of the cathode terminal portion 11a. In addition, the distance between the center C1 of the anode terminal portion 9a and the center C4 of the cathode terminal portion 11b may be equal to the distance between the center C2 of the anode terminal portion 9b and the center C4 of the cathode terminal portion 11b. These modified light-emitting elements 46 and 47 can provide the same advantageous effects as available in the light-emitting element 44 described earlier.

Fourth Embodiment

FIGS. 16A, 16B and 16C show processes of producing a light-emitting element 48 in accordance with a fourth embodiment of the present invention. The light-emitting element 48 of the present embodiment differs from that of the first embodiment in that a light-emitting layer 49 is formed so that the thickness and component ratio thereof can be continuously changed in a specified direction. Another difference resides in that the amounts of electric currents supplied to the anode terminal portions 9a and 9b per unit time are adjusted. Other configurations remain the same.

The light-emitting element 48 is produced in the following order. Referring to FIG. 16A, an anode 8 is formed on a base 7. Then, as illustrated in FIG. 16B, a light-emitting layer 49 is formed on the portion of the anode 8 other than the marginal portions of two mutually-opposing sides of the anode 8. The marginal portions of two mutually-opposing sides of the anode 8, on which the light-emitting layer 49 is not formed, are used as anode terminal portions 9a and 9b. Subsequently, as shown in FIG. 16C, a cathode 12 is formed on the base 7 and the light-emitting layer 49. The portion of the cathode 12 formed on the base 7 serves as a cathode terminal portion 11.

The light-emitting layer 49 is formed so that the thickness and/or the component ratio thereof is gradually increased or decreased along the line segment 50 interconnecting the anode terminal portions 9a and 9b. Since the light-emitting layer 49 is gradually changed in the film plane direction, the light emission color also gradually changes. The thickness and/or the component ratio of the light-emitting layer 49 can be adjusted by controlling deposition rates of the components.

The electric current supplied to the light-emitting element 48 is controlled by adjusting the amounts of electric currents supplied to the anode terminal portions 9a and 9b per unit time. The light emission color of the light-emitting element 48 can be arbitrarily changed by causing change in a current density distribution to generate a luminance gradation in the light-emitting layer 49. The light-emitting layer 49 is formed so that the light emission color thereof can be continuously changed. Therefore, if the amount of electric current supplied to the anode terminal portion 9a is increased, the color temperature of light is first changed in the anode terminal portion 9a and a luminance gradation is generated in which the luminance decreases from the anode terminal portion 9a toward the anode terminal portion 9b.

The current supply quantity is controlled by adjusting the duty ratio and the current intensity. Adjustment of the duty ratio is performed by sequentially changing the timing at which an electric current is supplied to the anode terminal portions 9a and 9b. Adjustment of the current intensity is carried out by the constant current circuit 13.

Figure 17A:
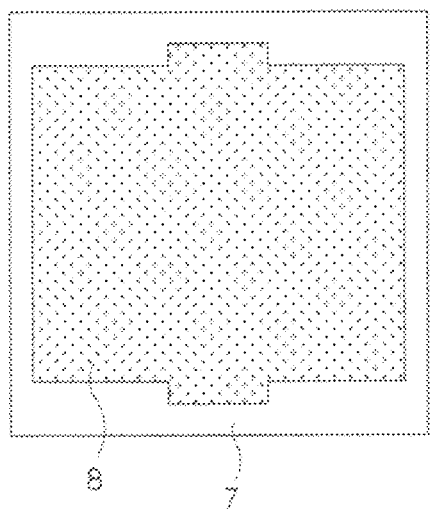
FIGS. 17A, 17B and 17C are views illustrating processes of producing a modified example of the planar light-emitting element of the fourth embodiment.
Figure 17B:
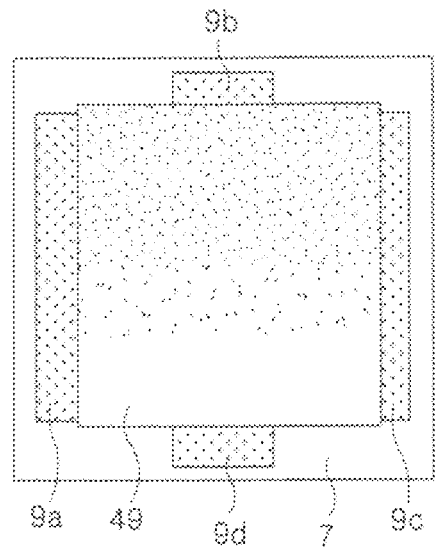
Figure 17C:
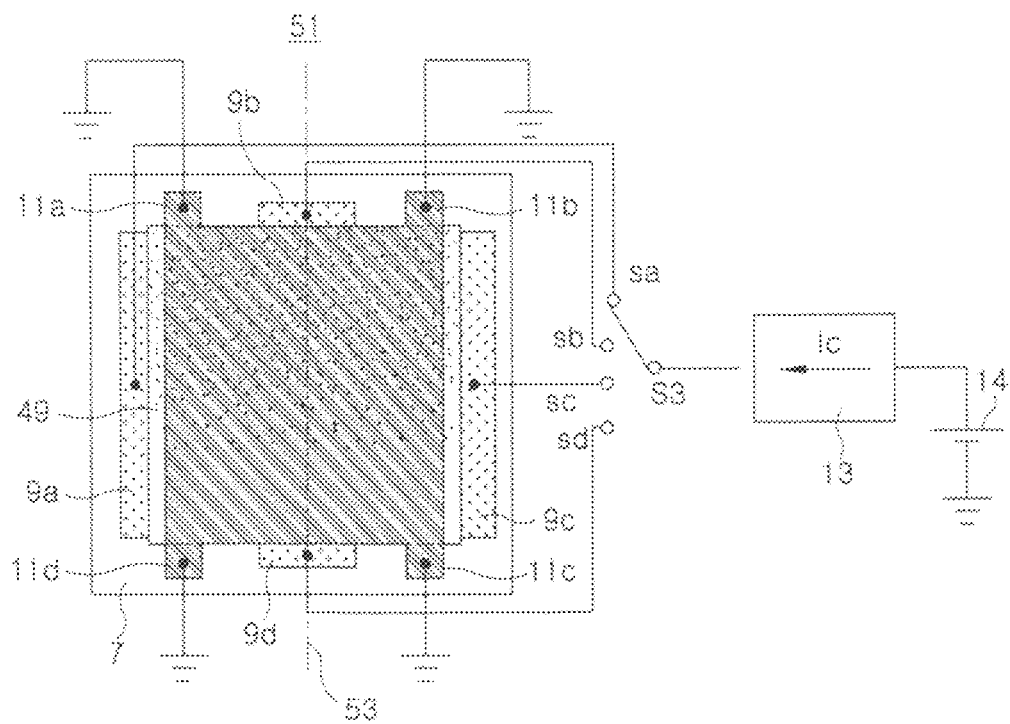
Figure 18:
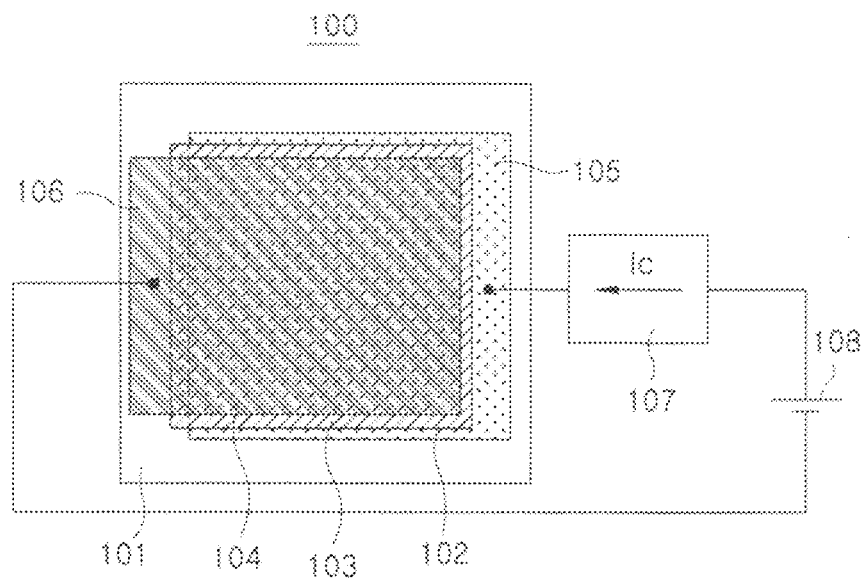
FIG. 18 is a plan view illustrating a conventional planar light-emitting element.
Figure 19:
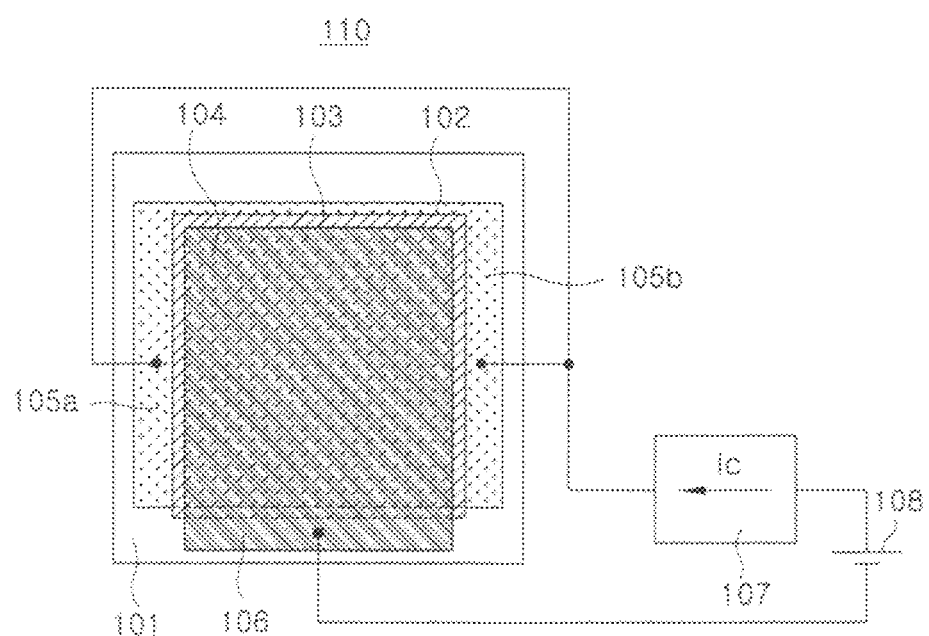
FIG. 19 is a plan view illustrating another conventional planar light-emitting element.
Figure 20:
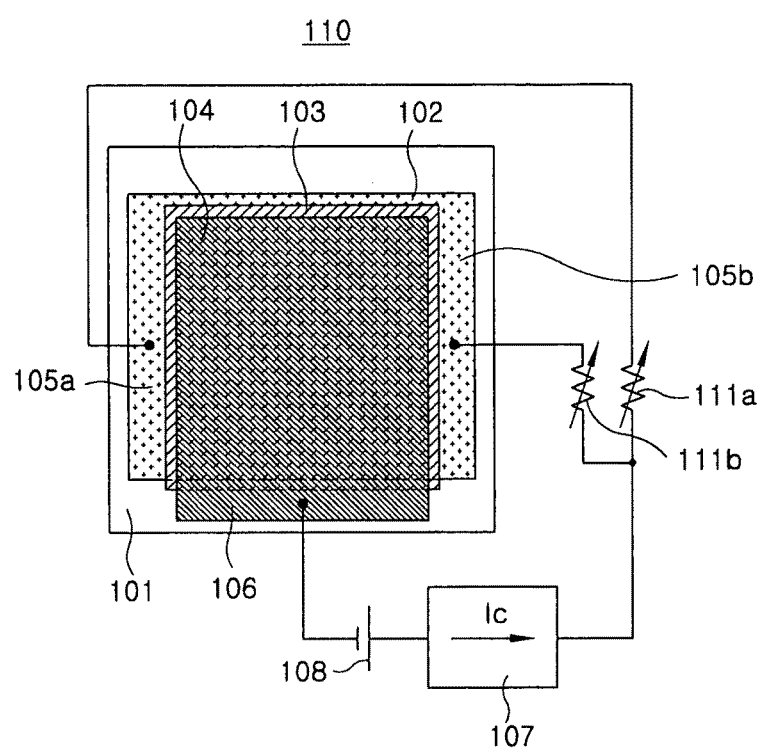
FIG. 20 is a plan view illustrating still another conventional planar light-emitting element.
Figure 21:
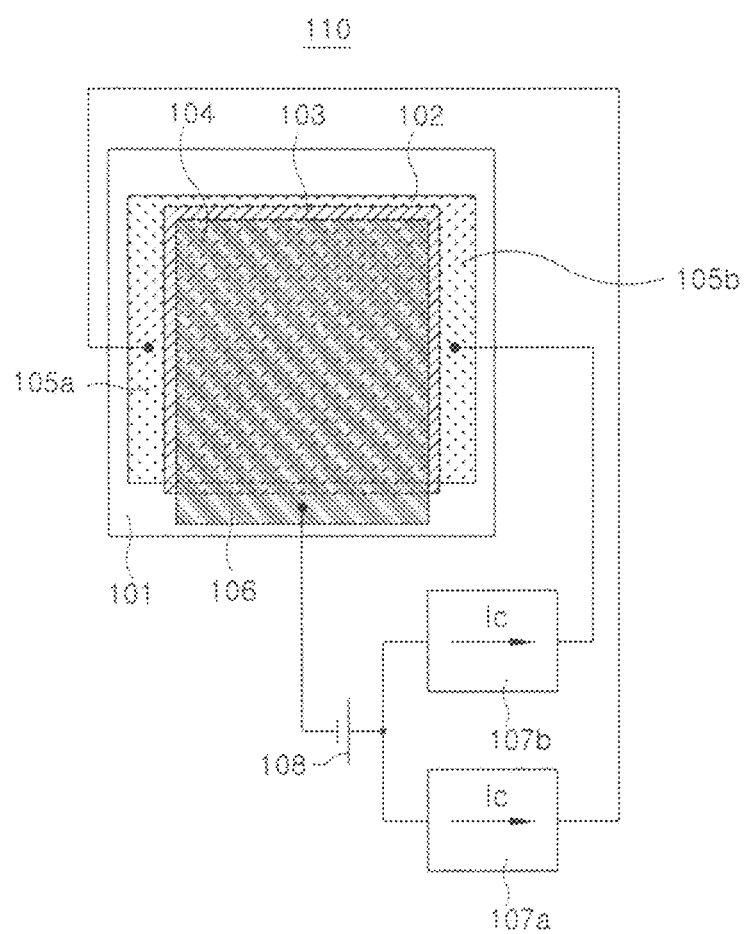
FIG. 21 is a plan view illustrating still another conventional planar light-emitting element.

FIGS. 17A, 17B and 17C are views for explaining processes of producing a light-emitting element 51 according to a modified example of the light-emitting element 48. The light-emitting element 51 includes anode terminal portions 9a, 9b, 9c and 9d provided at four sides of the anode 8 and cathode terminal portions 11a, 11b, 11c and 11d provided in the vicinity of four corners of a planar cathode electrode.

In the light-emitting element 51, the anode terminal portions 9a, 9b, 9c and 9d are electrically connected to the constant current circuit 13 and the power source 14 through a switch S3, the cathode terminal portions 11a, 11b, 11c and 11d being grounded. The switch S3 includes terminals sa, sb, sc and sd connected to the anode terminal portions 9a, 9b, 9c and 9d, respectively.

The light-emitting layer 49 is formed so that the thickness or the component ratio thereof is gradually increased or decreased along the line segment 53 interconnecting the anode terminal portions 9b and 9d. The electric current supplied to the light-emitting element 51 is controlled by adjusting the quantity of the electric current supplied to the anode terminal portions 9a, 9b, 9c and 9d per unit time. The light emission color of the light-emitting element 51 can be arbitrarily changed by causing change in a current density distribution to generate a luminance gradation in the light-emitting layer 49.

In the light-emitting element 51, the light-emitting layer 49 is formed so that the light emission color thereof can be continuously changed. Therefore, if the amount of electric current supplied to the anode terminal portion 9b is increased, the color temperature of light is first changed in the anode terminal portion 9b, and a luminance gradation is generated in which the luminance decreases from the anode terminal portion 9b toward the anode terminal portion 9d. Similarly, if the amount of the electric current supplied to the anode terminal portion 9d grows higher, the color temperature of light is first changed in the anode terminal portion 9d, thus generating a luminance gradation decreasing from the anode terminal portion 9d toward the anode terminal portion 9b.

In addition, if the amounts of electric currents supplied to the anode terminal portions 9a and 9c is increased, the color temperature of light is first changed in the central portion of the light-emitting layer 49, thus generating a luminance gradation decreasing from the central portion of the light-emitting layer 49 toward the anode terminal portions 9b and 9d. Moreover, if the ratio of the current supplying time periods for which an electric current is supplied to the anode terminal portions 9a, 9b, 9c and 9d is changed continuously, it becomes possible to realize the illumination by which the light emission color is wavily changed within the light emission surface. The light-emitting layer 49 may be formed so that the thickness or the component ratio thereof is gradually increased or decreased along a line segment interconnecting the anode terminal portions 9a and 9c, rather than the line segment 53.

The present invention shall not be limited to the configurations of the afore-mentioned embodiments but may be modified in many different forms without departing from the scope of the invention. For example, the timing at which the current flow paths are formed may not be changed over one after another. Alternatively, two current flow paths may be formed simultaneously for a certain time period, or no current flow path may be formed for a certain time period.

While the invention has been shown and described with respect to the embodiments, it will be understood by those skilled in the art that various changes and modifications may be made without departing from the scope of the invention as defined in the following claims.

What is claimed is:

1. A method for feeding electric power to a planar light-emitting element which includes a single light emission surface, a single planar anode electrode, a planar cathode electrode, a light-emitting layer provided between the single planar anode electrode and the planar cathode electrode, two or more anode terminal portions protruding from the single planar anode electrode and one or more cathode terminal portions protruding from the planar cathode electrode, comprising:

sequentially providing the electric power only to the two or more anode terminal portions protruding from the single planar anode electrode to thereby adjust a luminance distribution of the single light emission surface, wherein each of the planar anode electrode and the planar cathode electrode has a rectangular shape and the planar light-emitting element includes four anode terminal portions provided at four sides of the planar anode electrode and four cathode terminal portions provided at four corners of the planar cathode electrode.

2. A light-emitting element comprising:
a single light emission surface;
a single planar anode electrode;
a planar cathode electrode;
a light-emitting layer provided between the single planar anode electrode and the planar cathode electrode;
two or more anode terminal portions protruding from the single planar anode electrode;
one or more cathode terminal portions protruding from the planar cathode electrode; and
a power supply for supplying an electric power; and
a switch circuit connected to the two or more anode terminal portions, wherein the switch circuit is configured to sequentially supply the electric power from the power supply only to the two or more anode terminal portions protruding from the single planar anode electrode to thereby adjust a luminance distribution of the single light emission surface, wherein each of the planar anode electrode and the planar cathode electrode has a rectangular shape and the light-emitting element includes four anode terminal portions provided at four sides of the planar anode electrode and four cathode terminal portions provided at four corners of the planar cathode electrode.

* * * * *